United States Patent [19]
Henn

[11] Patent Number: 5,770,844
[45] Date of Patent: Jun. 23, 1998

[54] SUPERVISION OF TRANSACTIONS WITH CHIP CARDS

[75] Inventor: Horst Henn, Boeblingen, Germany

[73] Assignee: International Business Machines Corporation, Armonk, N.Y.

[21] Appl. No.: 736,888

[22] Filed: Oct. 25, 1996

[30] Foreign Application Priority Data

Oct. 26, 1995 [DE] Germany .................. 195 39 801.7

[51] Int. Cl.$^6$ ..................................................... G06K 5/00
[52] U.S. Cl. ........................... 235/380; 235/379; 902/26
[58] Field of Search ................... 235/379, 380; 902/26

[56] References Cited

U.S. PATENT DOCUMENTS 3,852,571  12/1974  Hall et al. .................... 235/379

Primary Examiner—Harold Pitts
Attorney, Agent, or Firm—K. O. Hesse; K. A. Seaman

[57] ABSTRACT

A transaction audit system is disclosed comprising a chip card, for completing a transaction between the holder of the chip card and a transaction partner such as a merchant. During the transaction, a transaction identifier is generated uniquely identifying the transaction. For completing execution of the transaction by posting of the payment amount to the merchants account, the chip card transmits a transaction receiver data record comprising the transaction identifier, and further data, if required, to a third party. To allow auditing the transaction settlement posting accuracy, the transaction provider also transmits a transaction provider data record comprising the corresponding transaction identifier to the third party. The third party is then able compare the receiver data record and the provider data record and identify possible irregularities, such as possible errors or manipulations in the transaction system, or intentional or non-intentional manipulation by the participants to the transaction, particularly the transaction receiver. The transaction identifier identifies both the transaction receiver data record and the transaction provider data record as being data records belonging to the same transaction.

13 Claims, 2 Drawing Sheets

SUPERVISION OF TRANSACTIONS WITH CHIP CARDS

BACKGROUND OF THE INVENTION

1. Field of the Invention

The invention relates to the supervision, auditing and accurate completion of transactions with chip cards.

2. Prior Art

Chip cards are used today, among other things, for payment of money without the transfer of cash or checks. For that purpose, the chip card comprises a purse into which a certain amount of money may be stored. On payment at a cashier or a respective automatic machine, the amount of money to be paid is transferred from the chip card of the customer providing the money to the receiver of the money, such as a merchant. As a rule, in such a transaction the purse of the customer is reduced by a certain amount and such amount is credited to the merchant or other transaction partner. The transaction partner then balances accounts directly or indirectly with the bank which credits the amount to the partners account.

For performing such a transaction, a number of procedures are known, such as IBM MONDEX, ec-Card, VISA etc. All such procedures use secret keys in order to secure the transfer of the money amounts. Such keys must be stored in a security module, e.g. in a second chip card or in special security modules implemented in hardware. The distribution and security of such keys to be used for performing a transfer are very costly. If a secret key becomes known, such as due to theft, all keys in the system must be replaced. Because the purses, as a rule, are anonymous and high amounts of money circulate in the system, it is very difficult to discover a misuse in a timely manner. Even though the keys remain secret, errors are possible in the system due to software and hardware failures.

In the use of purses on chip cards a distinction must be made between the so-called anonymous and non-anonymous purses. In the case of non-anonymous purses, the chip card transmits a respective individual identifier which is characteristic for this particular chip card during a transaction with this transaction partner. For such transaction a transaction data record is created which enables a merchant transaction partner to settle the transaction with a bank in order to obtain the amount of money as credit on the merchant account. A non-anonymous transaction data record includes information related to the chip card, the record permits directly correlating the transaction back to the chip card and thereby to the holder of the chip card. Therefore modes of behavior of the chip card holders may be derived from a plurality of transaction data records. Such correlation is undesirable from the perspective of data and privacy protection.

In the case of anonymous purses, however, the chip card does not furnish an identifier identifying the chip card during the transaction with the transaction partner. However, in a transaction using an anonymous purse, a data record will be created as before, which enables a merchant transaction partner to settle the transaction accounts with a bank. The transaction data record does, however, not permit an attacker to correlate the transaction back to the holder of the chip card and thereby identify the holder or perpetrate a fraudulent transaction using the holders identity. Anonymous purses are today preferred for reasons of data protection, since the monitoring and reproducing of the customer's behavior is not possible.

In the prior art, a chip card is read by a chip card reader, of a transaction partner, such as a merchant. During the transaction a transaction data record TD is created which enables the transaction partner to settle the accounts of the transaction. The transaction partner establishes an immediate connection with a communication port of a bank computer 35, either directly through a settlement transmission path 40 or indirectly, and transfers the transaction data record to the computer 35 for settling the accounts of the transaction. The respective amount corresponding to the transaction is then credited to the transaction partner. The amount has already been debited from the purse of the chip card and earlier debited from an account of the customer when the balance in the chip card purse was loaded or raised.

In today's usual bank payment transaction system, using checks or remittances, the customer monitors account settlement posting accuracy by reviewing each month end statement. The customer himself has a vital interest in determining that his payments are correctly settled. On the basis of the statements of account or the paid checks, the customer has the possibility of checking the accuracy of the payments and transactions. By this means a reasonable audit of the payment transaction system is obtained.

If printed money from a hand held purse is used, monitoring the accuracy of settlement of the payment transaction is likewise carried out by the customer himself. Incorrect payment, as a rule, is quickly detected by the customer as incorrect small change.

In the case of payment of money amounts with chip card purses, a review of the actually settled account cannot be carried out by means of known procedures, and especially with anonymous purses. Even in the case of non-anonymous chip card purses, a check by the customer is of little avail since the customer, as a rule, is not likely to investigate the plurality of payments of small amounts. In particular small irregularities such as rounding or other manipulations by the money receiver remain usually undiscovered by the customer.

SUMMARY OF THE INVENTION

It is an advantageous effect of the instant invention that transactions consummated by means of a chip card may be audited.

A further advantageous effect of the invention is that the settlement of transactions involving payment made by a non-anonymous chip card can be audited without requiring extra effort on the part of a consumer or customer.

A still further advantageous effect of the invention is that the accuracy of settlement of transactions involving payment made by an anonymous chip card can be audited without compromising the anonymity of the card holder.

These and other advantages of the invention are obtained by providing a transaction receiver data record which contains a transaction identifier and other data. The transaction receiver data record is transmitted to a third party for settlement. The transaction identifier facilitates identification of the transaction and contains all data as required for the identification of the transaction and for proving that the customer and merchant are each authorized participants within the system in which the transaction is being carried out. The transaction identifier is created during the transaction and is available to all participants in the transactions by means of the chip card and the chip card reader.

Generally, in each transaction there are at least one transaction provider and at least one transaction receiver. The transaction provider transfers something, such as an amount of money, to the transaction receiver, and the transaction receiver intends then to process the transaction generally with a third party, such as a bank or another participant in the transaction system, in which the transaction is carried out. In this context it is to be understood that everyone participating in the transaction may be both transaction provider and transaction receiver. The one participant in the transaction who wants to claim the monetary proceeds of the transaction for himself, i.e. the transaction receiver, must have the transaction identifier for completing settlement the transaction.

For completing the execution of the transaction, the transaction receiver transmits a transaction receiver data record which contains a transaction identifier and other data to a third party such as a bank. The transaction receiver data record permits the bank to complete the monetary transfer of the transaction by carrying the data required for settlement. The transaction identifier substantially serves to identify the transaction and, if required, also for proving that the transaction participants, also known as the transaction provider and the transaction receiver, are authorized participants within the system in which the transaction is carried out. It will be understood that the transaction receiver record may be identical with the transaction identifier if the transaction identifier already carries enough information to enable execution of the settlement steps of the transaction.

In order to audit for accurate settlement of the transaction in accordance with the instant invention, the transaction provider transfers a transaction provider data record, which also includes the respective transaction identifier, to the third party. The transaction provider data record may also have other data which helps in the audit of the transaction such as data which directly or indirectly identify the transaction provider, or more detailed data related to the transaction. The transaction identifier again serves to identify the transaction. In analogy with the transaction receiver data record, the transaction provider data record may be identical with the transaction identifier, if the transaction identifier itself enables auditing of the transaction.

The third party is then in a position of drawing conclusions from a comparison of the transaction receiver data record as transmitted by the transaction receiver, with the transaction provider data record as transmitted by the transaction provider regarding contingent irregularities during the transaction, such as possible errors or manipulations in the transaction system, or also regarding intentional or non-intentional manipulations by the transaction participants, in particular the transaction receiver. In this connection the transaction identifier identifies both the transaction receiver data record and the transaction provider data record as being data records corresponding to the same transaction.

The auditability of transactions, according to the invention, by means of a separate transmission of the transaction data records, i.e. the transaction receiver data record by the transaction receiver who must transmit such transaction identifier to the third party for executing the transaction anyway, and of the transaction provider data record by the transaction provider who transfers the transaction identifier in view of the checkability of the performed transaction to the third party, permits thereby effective auditing of the transaction system and also of the participants in the transaction.

It is not necessary, although it is preferred, that the audit be initiated by the transaction provider. The third party or another participant in the transactions system, may control which transaction provider data record, when, by whom and under what circumstances is to be transmitted to the third party. For this reason preferably an examination parameter is set which determines whether a respective transaction provider data record is to be transmitted to the third party by the transaction provider. Such examination parameter may thereby be set firm, according to stochastic criteria, in accordance with the importance of the transaction, for checking certain transaction receiver groups, or also with reference to certain geographical areas. If the examination parameter is set, the respective transaction provider data record of the respective transaction is prepared and may then be transmitted by the transaction provider to the third party for checking the transaction. If no examination parameter is set, there is no examination of the transaction. The checking parameter can optionally be preset e.g. by the transaction provider, or also by an operator of the system for checking the system. Thereby there is the possibility that the examination parameter is set without the transaction provider being aware of it.

By means of the selection of the transaction identifier and the transaction data records, i.e. which pieces of information are contained therein, the examination or audit may further be modified. For example, if the anonymity of the transaction provider is to be maintained, the transaction identifier and the transaction provider data record must not allow a link back to the identity of the transaction provider. Preferably the transaction identifier contains information concerning the transaction receiver, such as a merchant identity, and the transaction event, e.g. date and amount in the case of a payment transaction. If a link back to the transaction provider is desired, the transaction identifier may also contain information concerning the transaction provider.

The transmission of the transaction provider data record by the transaction provider according to the invention may further be used for producing a voucher of the transaction for the transaction provider. The transaction provider gets a transaction voucher at the transmission of the transaction provider record to the third party—e.g. upon request—for the transaction marked by the transaction provider data record.

The invention is preferably used for payment transactions during which a certain amount is to be transferred from a purse of a chip card, of the transaction provider, to a transaction receiver, such as a merchant. During the communication of the chip card with the chip card transceiver and the computer 25 of the transaction receiver, the chip card learns the identity from the transaction receiver and transmits the required amount to him. For security reasons, prior to the commencement of the communication, a security check is conducted from which it becomes known whether the chip card is a valid chip card and whether the transaction receiver is a legal participant in the transaction system. The transaction receiver then creates a corresponding transaction identifier from at least those data, including the transaction provider identity, the amount and a data record referring to the security check, which will be required for a subsequent completion of the transaction, by crediting or posting the transaction amount. The transaction identifier and perhaps also other data are stored in a respective transaction receiver data record of the transaction receiver.

After the setting of the examination parameter in the chip card, the chip card stores the transaction identifier, preferably in a separate data record and the transaction provider data record. On occasion of one of the next communications of both the chip card and the transaction receiver, with devices competent for settling the transaction, the transaction data records are transferred to a central device of the third party. The central device compares the transmitted transaction data records in accordance with the transaction identifier which identifies the settled transaction. In case of discrepancies between the transaction data records, appropriate measures can be initiated. Transaction provider data records to which no respective transaction receiver data records can be coordinated, indicate alterations or manipulations of the transaction identifiers.

The marking of the transaction data records with the respective transaction identifier according to the invention allows a precise check and comparison of the data records as supplied for processing of the transaction. Inconsistencies between data records identified with the respective transaction identifiers thus indicate irregularities in the system or among the participants and can reveal an intentional or non-intentional alteration of the data records. Which data are required therefor may vary from case to case and may be defined in accordance with prescriptions and security requirements.

The transmission of the transaction identifier according to the invention allows the auditability of transactions using anonymous chip card purses. In this respect, the transaction identifier and the transaction data record must not reveal the identity of the chip card purse holder. However, the transaction identifier must be selected so that a coordination of the data records of the transaction is possible.

In a preferred embodiment the audit of a transaction is carried out in accordance with an examination parameter that can be preset by the chip card holder, the payee or the system operator of the chip card purse system. The audit of the transaction may be carried out according to statistical criteria, a random procedure or with a view to immediately checking the system or various individual participants.

The procedure according to the invention may be used to audit every transaction in purse systems with chip cards, such as when the system is newly introduced, and it also may be used in a statistical mode by checking only selected transactions in very large purse systems with billions of payment events.

The invention is preferably utilized in transactions between a mobile chip card and a stationary device, which is either connected 'on-line' with the central device of the third party or is operated 'off-line' without a connection with the central device of the third party. By applying the invention in 'off-line' environments, transactions between two chip cards, may be monitored or audited by the invention.

The invention may be used with all data carrier cards and is not limited to chip cards. In particular also pure memory cards (electric, magnetic or also optical storage cards) or hybrid cards with a combination of the features of processor cards, magnetic cards or optical cards may be used. Also instead of data carrier cards other 'off-line' operable media may be used for the performance of transactions.

DESCRIPTION OF THE PREFERRED EMBODIMENT

Figure 1:
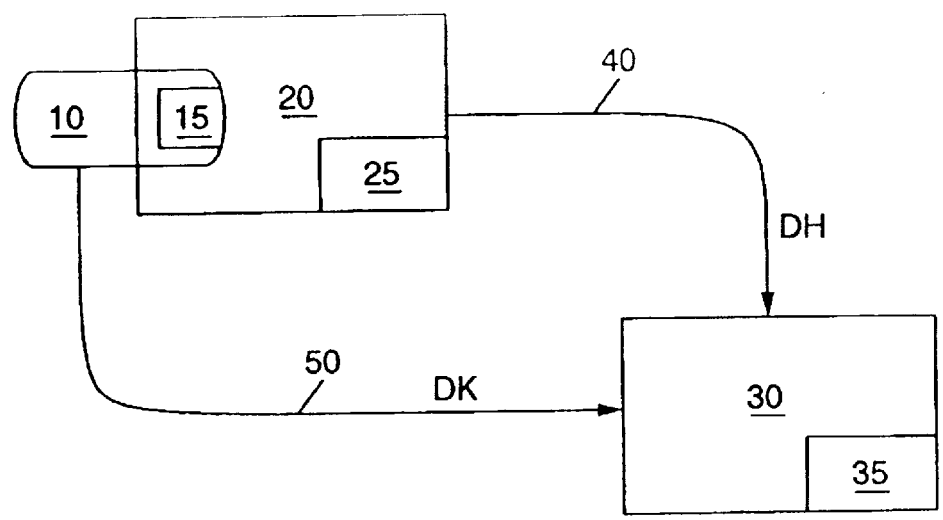
FIG. 1 Is a block diagram showing a chip card, chip card reader and a third party settlement device and their logical connections for auditing a transaction according to the invention.

FIG. 1 shows the payment transaction procedure with a chip card in accordance with the invention. The payment transaction event is described with an anonymous chip card purse, however the invention is not limited thereto. During the payment transaction event, data is exchanged between the chip card 10 of the customer payor and the respective device 20 of the merchant payee, such as a cash box of a merchant. The cash box facility has a chip card transceiver form communicating with the chip card.

Figure 2:
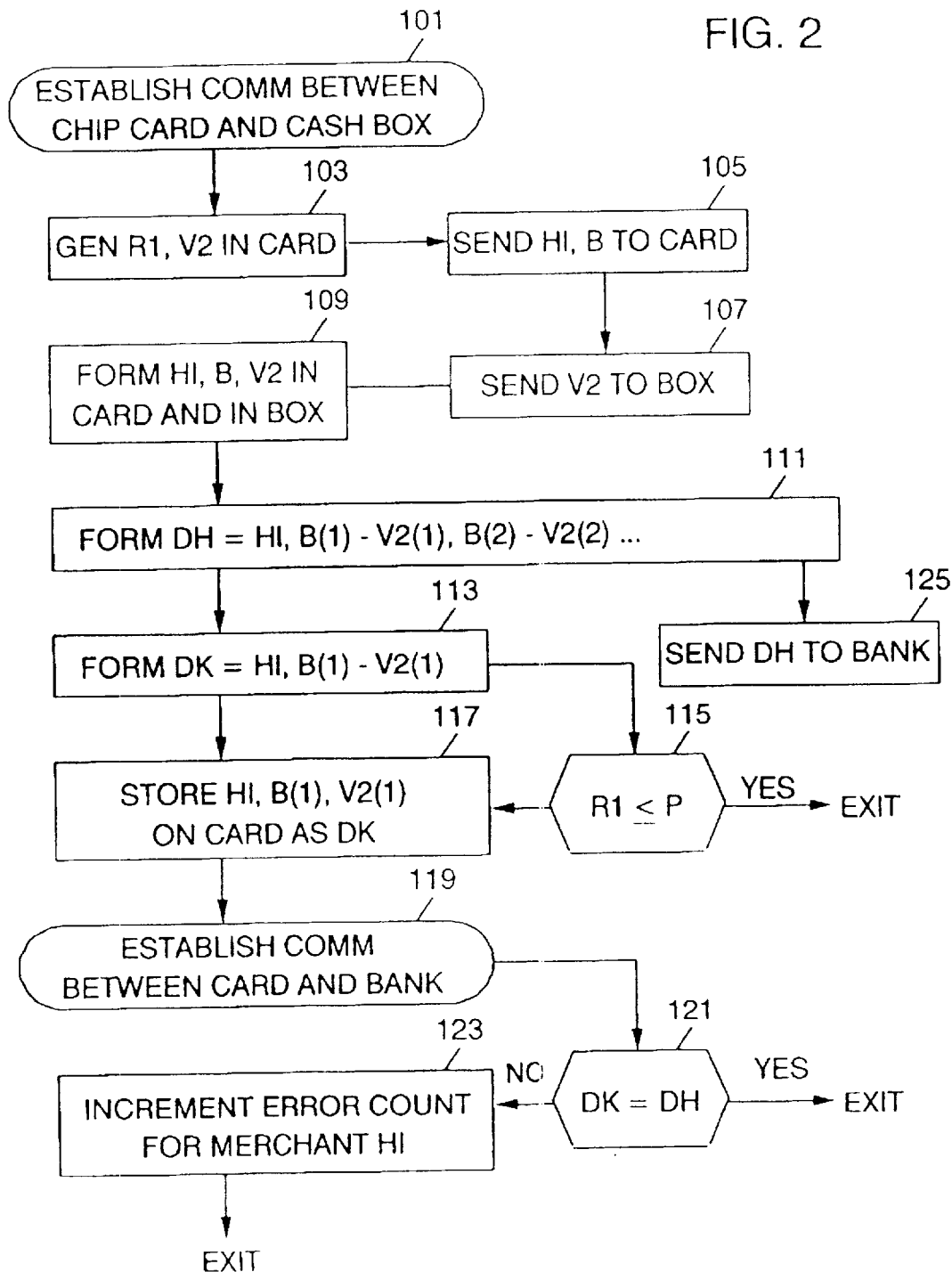
FIG. 2 Is a flow diagram of the method of the invention.

In addition to the data necessary for establishing the communication, shown as block 101 in FIG. 2, between the cashbox 20 and the chip card 10, part of which may be encrypted, the exchanged data contain an amount of payment and an identification of the merchant. Such data are required for the later completion of the payment event, by the factual transfer of the money amount corresponding to the payment amount to the account of the merchant at the supervising facility 30 of the third party.

Prior to executing a respective payment event, a mutual security check between the computer 15 of chip card 10 and the computer 25 of cash box 20 proves that both are authorized parties to the payment system. In this respect, as shown in FIG. 2 at block 103, two random numbers R1 and R2 are generated in computer 15 on the chip card 10. The random number R2 is encrypted by means of a key SO stored on the chip card 10 or is selected out of a set of stored random numbers R21, R22, . . . R2$i$ to obtain V2. Any encryption method, such as DES (data encryption standard/system) can be used. The result is a random value V2=F(S0,R2) or V2=F(R2i). The key SO stored on the chip card 10 should be entirely anonymous so that the various payment events of the chip card 10 can be processed anonymously.

On the chip card 10 there is a selection parameter S which indicates during any one transaction whether or not the chip card 10 is to carry out the method for checking the correctness of the payment transaction according to the invention. The selection parameter S may be generated during the personalization of the chip card 10 by an operator of the payment system or by an algorithm, e.g. depending on the amount, the merchant identifier or other parameters.

OPERATION OF THE PREFERRED EMBODIMENT

Referring now to FIG. 2, during the payment transaction event, a merchant identifier HI of the merchant and the amount B to be deducted from the chip card 10 are transferred from the computer 25 of cashbox 20 to the computer 15 of chip card 10 at block 105. From the chip card 10, the random value V2 is transmitted to the cashbox 20 of the merchant as shown in block 107. In the cashbox 20 of the merchant, a transaction identifier is generated by computer 25 at block 109 which includes the merchant identifier HI and the amount and the created random value V2. The transaction identifier marks the payment transaction event between the chip card 10 and the merchants cash box 20. The random value V2 indicates during the following settling of accounts, whether the chip card 10 and the merchants cash box 20 are valid parties in the payment system. The transaction identifier is placed into a merchant data record DH at block 111 which may contain yet other data or in which a plurality of various payment events are combined. The merchant data record DH comprises the merchant identifier HI and of pairs B(1)-V2(1), B(2)-V2(2), . . . , B(i) being thereby the amount of the i-th event and V2(i) symbolizing the i-th random value. All payments are documented in that merchant data record DH. If 8 bytes are added to the merchant identifier and the amount B and the random value V2 are encrypted each with 4 Bytes, 255 payment events may be protocolled by one kilobyte. This merchant data record DH is transferred by the merchant at block 125 to the supervising facility 30 such as a bank terminal having a computer 35 for settling the accounts. The transfer of the data record DH may be carried out on-line through transmission path 40 or also by means of a special chip card for storing payee data. It is recognized that paths 40 and 50 can be either physical telecommunication lines or alternately can be transceivers such as used in cashbox 20 for communicating with chip cards.

The audit of the payment event according to the invention is carried out by means of a check transmission path 50. In every payment transaction event, the merchant identifier HI, the amount B and the random figure V2 are stored on the chip card 10 as shown in block 113. In this way, the last payment transaction event and, optionally also a plurality of payment events, may be checked and even may be canceled. The selection parameter S decides whether the data marking the payment transaction event are to be specially stored on the chip card 10 at block 117. For example as shown at block 115, if the random number RI is bigger than a certain preset threshold value P which was set by the selection parameter S, the transaction identifier being part of the payment transaction event and comprising HI, B and V2 is specially stored in a customer data record DK at block 117. The customer data record DK may additionally contain other information or combine a plurality of transaction identifiers of different transactions.

The one or more customer data records DK stored on the chip card 10 are called at block 119 by the third party supervising device 30 on occasion of the next 'on-line' contact of the chip card 10 with the device 30, or at the next loading of the purse of the chip card 10. The respective customer data record DK may then be compared at block 121 with the respective merchant data record DH by the computer 35 system at device 30 by using the transaction identifier characterizing the respective transaction, or with the partial data characterizing the payment transaction event.

The comparison of the respective data records permits an immediate auditability of the payment events marked by means of the selection parameter S. If the data characterizing a respective payment transaction event of the customer data record DK differ from that of the merchant data record DH, there must be an error either on the side of the merchant, the customer or within the system, and appropriate measures can be initiated. Accumulations of such irregularities at block 123 of data records from a certain merchant may indicate an intentional or non-intentional manipulation of the data by that merchant. By means of the selection parameter S, thus again certain merchants, group of merchants or regional districts may be effectively surveyed for correct processing of the payment events.

The anonymity of the data while using the anonymous chip card purses may be warranted by anonymously storing the customer data record DK by the system operator. With the consent of the customer, the customer data record DK may be provided with the customer identifier, so that the customer is able to check his payment events with the purse of his chip card 10 by random sampling. The threshold value P of the selection parameter S could be set to P=0 by the customer if the customer wants to get vouchers for small amounts for business purposes.

Due to the selection of the threshold value P=0 in the initiating phase of a purse system, the efforts of auditing and the commercial risk of operating the purse may be minimized.

The system for supervising transactions by means of chip cards in accordance with the invention does not necessitate any other key but the one which is stored on the chip card 10. Payment events may therefore be carried out with already known chip cards of the prior art. Special security modules are not required. Chip card purse systems may therefore be introduced quicker and at lower costs. In particular, the mentioned supervision system according to the invention is suitable for small local purse systems, in a town or a region, and may be implemented quickly and at low costs.

While the invention has been shown and described with respect to the preferred embodiment, it will be understood by those skilled in the art of system design that various changes may be made without departing from the spirit and scope of the invention as measured by the following claims. For example simplified auditing of payment transactions according to the invention may be carried out between two or more chip cards participating in a payment transaction. In such case, the merchant data record DH is stored in a merchant chip card and is transmitted during a next 'on-line' contact with the supervising bank device 30 for factual settlement, such as by a credit note or a refill of a purse on the merchant chip card.

It will be understood by those skilled in the art that the device 30 may also be a system of individual computers and chip card readers/writers which are provided by one or more legal entities who operate and maintain the transaction system.

What is claimed is:

1. Method for supervising a transaction between a transaction provider and a transaction receiver, using a chip card comprising the steps of:

providing a connection between the transaction provider and the transaction receiver, the connection including the chip card communicating with a chip card transceiver;

performing the transaction wherein a transaction identifier is generated to identify the transaction;

storing the transaction identifier in the chip card;

transmitting a transaction receiver data record, comprising the transaction identifier to a third party for completion of the transaction; and transmitting a transaction provider data record, comprising the transaction identifier to the third party for audit of the transaction.

2. Method of claim 1, further comprising the step of:

comparing a transaction receiver data record with a transaction provider data record using a transaction identifier of a respective transaction to check that the transaction has been correctly settled.

3. Method of claim 2, further comprising the step of:

setting a check parameter, so that the transfer of the transaction provider data record to the third party by the transaction provider is carried out only when the check parameter for the transaction is set.

4. Method of claim 3, wherein the check parameter is set by the third party.

5. Method of claim 3, wherein the check parameter is set by a holder of the chip card.

6. Method of claim 4, wherein the check parameter is set so that the transaction provider data record is transmitted by the transaction provider to the device of third party only if the transaction meets a presettable criterion.

7. Method of claim 6, wherein the check parameter is set according to stochastic criteria.

8. Method of claim 4, wherein the transmission of the transaction provider data record to the third party occurs during an on-line contact with a transceiver device following the transaction.

9. Method of claim 2, further comprising the step of;

evaluating information obtained from comparison of the transaction receiver data record and transaction provider data record and from the system in which the transaction is executed.

10. Method of claim 9, wherein the transaction identifier and the transaction provider data record do not contain information identifying the transaction provider.

11. Method of claim 5 wherein the transaction provider receives a voucher of the executed transaction after the transmission of the transaction provider data record to the third party.

12. A system for supervising a transaction between a payor and a payee using a chip card, comprising:

a payee device including a transceiver for providing a payment connection between the chip card of the payor and the payee device of the transaction receiver;

means in the card for generating a transaction identifier to identify the transaction;

a storage in the card for storing the transaction identifier;

a transmission path for transmitting a transaction receiver data record comprising the transaction identifier from the payee device to a third party facility for a completing settlement of the transaction:

a transmission path for transmitting a transaction provider data record comprising the transaction identifier from the card of the payor to the third party facility;

whereby the third party may supervise transfer of the transaction amount to the account of the payee.

13. Apparatus for supervising a transaction between a transaction provider and a transaction receiver in a system comprising a transaction provider chip card and a transaction receiver facility for communicating with the chip card and for performing the transaction between the transaction provider and the transaction receiver comprising:

means in the chip card for generating a transaction identifier from a random number, the transaction amount, and a transaction receiver identifier;

a supervising facility for receiving a transaction receiver data record, comprising the transaction identifier, from the transaction receiver facility;

the supervising facility also receiving a transaction provider data record comprising the transaction identifier, from the transaction provider chip card;

a comparator in the supervising facility comparing the transaction receiver data record with the transaction provider data record using the transaction identifier.

* * * * *